United States Patent
Enochs et al.

(10) Patent No.: US 12,182,837 B1
(45) Date of Patent: Dec. 31, 2024

(54) OBTAINING AND ESTIMATING REPAIR OR REPLACEMENT INFORMATION FROM A SMART BUILDING

(71) Applicant: UIPCO, LLC, San Antonio, TX (US)

(72) Inventors: Andrew Enochs, San Antonio, TX (US); David Patrick Dixon, Boerne, TX (US); Samuel Ngure, Phoenix, AZ (US); Scott Matthew Myrick, Land O Lakes, FL (US)

(73) Assignee: United Services Automobile Association (USAA), San Antonio, TX (US)

( * ) Notice: Subject to any disclaimer, the term of this patent is extended or adjusted under 35 U.S.C. 154(b) by 489 days.

(21) Appl. No.: 17/211,478

(22) Filed: Mar. 24, 2021

Related U.S. Application Data

(60) Provisional application No. 62/994,698, filed on Mar. 25, 2020.

(51) Int. Cl.
| | |
|---|---|
| *G06Q 30/0283* | (2023.01) |
| *G06K 7/10* | (2006.01) |
| *G06Q 10/20* | (2023.01) |

(52) U.S. Cl.
CPC ..... *G06Q 30/0283* (2013.01); *G06K 7/10297* (2013.01); *G06Q 10/20* (2013.01)

(58) Field of Classification Search
CPC .... G06Q 30/0283; G06Q 10/20; G06Q 50/16; G06Q 50/163; G01M 3/16; G06F 2221/2111; H04W 4/80; G06K 7/10297
See application file for complete search history.

(56) References Cited

U.S. PATENT DOCUMENTS

| | | | | |
|---|---|---|---|---|
| 8,423,300 | B1* | 4/2013 | diGirolamo | G01L 1/005 |
| | | | | 324/700 |
| 10,042,341 | B1* | 8/2018 | Jacob | H04L 12/2818 |
| 10,088,306 | B1* | 10/2018 | Smith | G01C 9/06 |
| 10,667,328 | B1* | 5/2020 | Lewis | H04W 4/029 |

(Continued)

OTHER PUBLICATIONS

Zhang, Jun et al. "A Review of Passive RFID Tag Antenna-Based Sensors and Systems for Structural Health Monitoring Applications." Jan. 29, 2017, MDPI, Sensors vol. 17, 265. (Year: 2017).*

*Primary Examiner* — Sarah M Monfeldt
*Assistant Examiner* — Michael J. Monaghan
(74) *Attorney, Agent, or Firm* — Potomac Law Group PLLC; Dannon G. Allbee

(57) ABSTRACT

System, methods, and apparatus for obtaining repair or replacement related information are described. For example, a mobile device is configured to scan RFID tags or other identifiers located on or in studs behind a wall of a house, obtain an identifier of at least one RFID tag of the plurality of RFID tags, determine a number of RFID tags scanned, generate and send, to a server, a message comprising the identifier of the at least one RFID tag, the number of RFID tags scanned, and an account identifier. The server can be configured to receive the message, determine a distance between two adjacent studs based on the identifier of the at least one RFID tag, determine a total distance of a scanned region of the wall based on the number of RFID tags scanned and the distance between the two adjacent studs, and determine an estimate of a cost of replace or repair based at least on the total distance.

18 Claims, 7 Drawing Sheets

(56) References Cited

U.S. PATENT DOCUMENTS

| | | | |
|---|---|---|---|
| 10,692,160 B1* | 6/2020 | Lyons | G06V 20/17 |
| 2006/0180647 A1* | 8/2006 | Hansen | G07F 17/20 |
| | | | 235/375 |
| 2010/0090802 A1* | 4/2010 | Nilsson | H01Q 1/2225 |
| | | | 702/182 |
| 2010/0123583 A1* | 5/2010 | Bommer | G06K 19/0723 |
| | | | 340/572.7 |
| 2012/0127976 A1* | 5/2012 | Lin | G06K 17/0022 |
| | | | 340/10.4 |
| 2012/0161968 A1* | 6/2012 | Bodapati | G08B 13/2485 |
| | | | 340/572.1 |
| 2013/0138465 A1* | 5/2013 | Kahle | G06Q 10/063114 |
| | | | 705/7.17 |
| 2013/0321131 A1* | 12/2013 | Tucker | G06K 7/10366 |
| | | | 340/10.1 |
| 2016/0253633 A1* | 9/2016 | Epstein | G06Q 30/0283 |
| | | | 705/305 |
| 2017/0032302 A1* | 2/2017 | Lete | G06Q 50/08 |
| 2017/0160111 A1* | 6/2017 | Dowdall | G01N 33/383 |
| 2017/0167932 A1* | 6/2017 | Donskoy | G01M 5/0041 |
| 2017/0186094 A1* | 6/2017 | Plummer | G06T 15/08 |
| 2017/0248529 A1* | 8/2017 | Hyre | G01R 27/28 |
| 2017/0322119 A1* | 11/2017 | Da Silva | G06K 7/10386 |
| 2018/0069932 A1* | 3/2018 | Tiwari | G08B 29/18 |
| 2018/0089546 A1* | 3/2018 | Jones | G06K 19/06196 |
| 2018/0089988 A1* | 3/2018 | Schwarzkopf | G06Q 50/08 |
| 2018/0223891 A1* | 8/2018 | White | G01K 1/024 |
| 2019/0049274 A1* | 2/2019 | Browning | G01D 11/30 |
| 2019/0057169 A1* | 2/2019 | Santarone | G06T 19/006 |
| 2019/0205579 A1* | 7/2019 | Rudy | G06K 7/10366 |
| 2020/0065433 A1* | 2/2020 | Duff | G01S 5/02 |
| 2020/0265288 A1* | 8/2020 | Volkerink | H04W 4/33 |
| 2021/0096273 A1* | 4/2021 | Chen | G01V 3/088 |
| 2021/0156715 A1* | 5/2021 | Stauss | G01R 29/085 |

* cited by examiner

OBTAINING AND ESTIMATING REPAIR OR REPLACEMENT INFORMATION FROM A SMART BUILDING

CROSS-REFERENCE TO RELATED APPLICATION(S)

This application is a non-provisional of and claims priority to U.S. Provisional Application No. 62/994,698, filed on Mar. 25, 2020, entitled "OBTAINING AND ESTIMATING REPAIR OR REPLACEMENT INFORMATION FROM A SMART BUILDING," which is hereby incorporated by reference in its entirety for all purposes.

BACKGROUND

Homes equipped with smart home technology enable home owners to have more convenience compared to homes without such technology. With the advent of smart home technology, home owners can access relevant information about their homes on their mobile devices. For example, a home owner can use an application installed on her mobile device to lock or unlock from anywhere a smart lock installed on her home. In another example, a smart thermostat or a smart water heater can provide on a mobile device application information regarding a home owner's energy usage and can even regulate heating or cooling cycles based on a schedule determined over time. Thus, smart home technology can assist a home owner to conveniently maintain or use his or her home.

Figure 1:
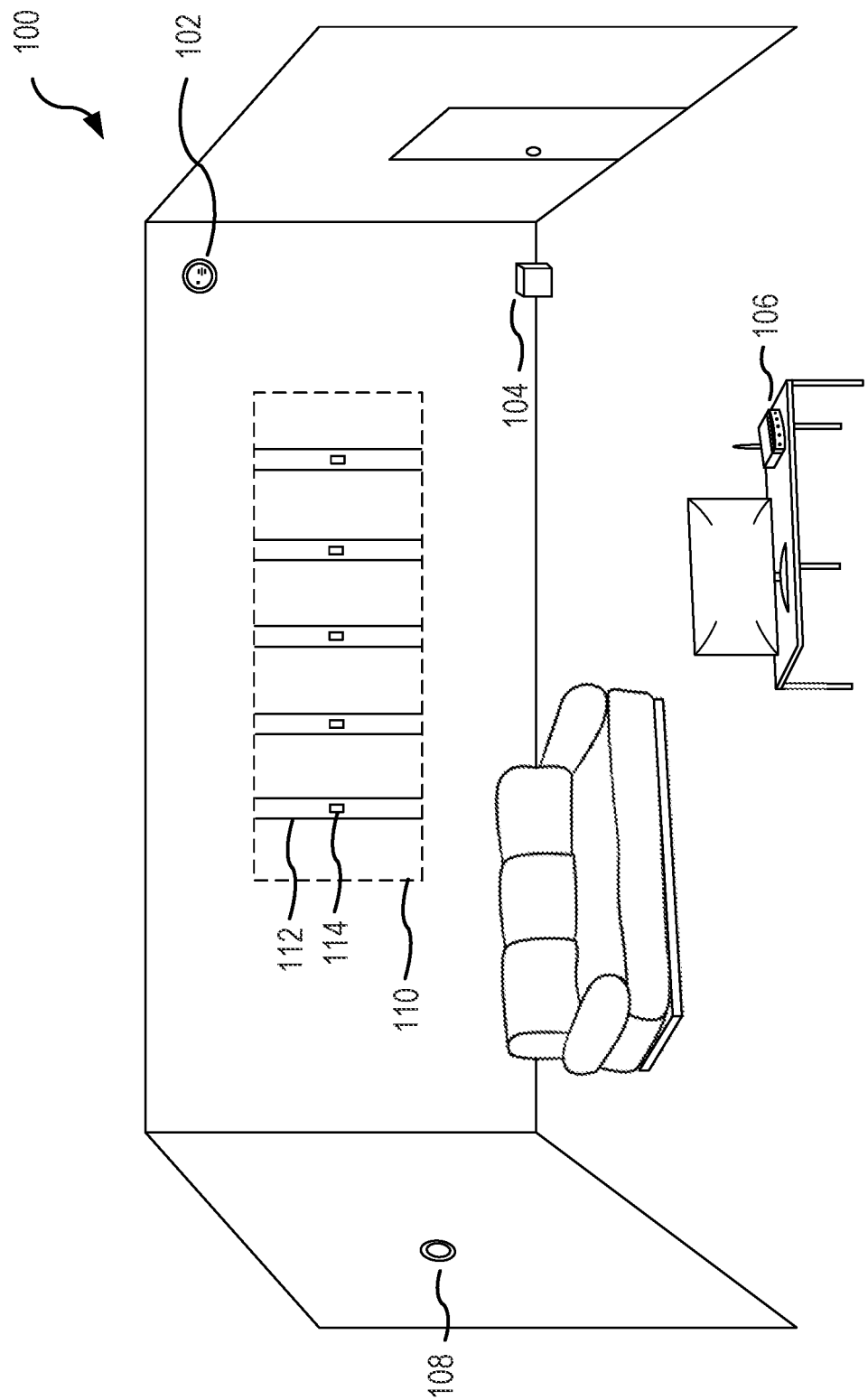
FIG. 1 shows an example of a room equipped with smart home technology to enable a system to obtain repair related information in accordance with embodiments of the technology.

The techniques introduced here may be better understood by referring to the following Detailed Description in conjunction with the accompanying drawings, in which like reference numerals indicate identical or functionally similar elements. Moreover, while the technology is amenable to various modifications and alternative forms, specific embodiments have been shown by way of example in the drawings and are described in detail below. The intention, however, is not to limit the technology to the particular embodiments described. On the contrary, the technology is intended to cover all modifications, equivalents, and alternatives falling within the scope of the technology as defined by the appended claims.

DETAILED DESCRIPTION

Currently, when a home is damaged due to an unexpected event such as a fire or a water leak, the home owner calls his or her home insurance provider to provide information about the type of damage to the home so that the home insurance provider can send an adjuster to assess the cause of the damage and the extent of the damage, and to determine the cost of repairing or replacing the damaged region of the house. The adjuster is also expected to prepare a repair or replacement estimate for the damaged region of the house while ensuring that the new fixed region has the same or similar color or type of material to match the surrounding undamaged areas of the home. Such a conventional technique relies on the judgment of the adjuster or a contractor to provide information about the color and/or the type of material.

A problem with such a conventional system is that the adjuster may provide to a server operated by the home insurance provider repair or replacement related information such as color and/or type of material of the surrounding undamaged region which may not be accurate. Another problem with conventional system is that the extent of the damage and repair related information cannot be quickly determined because such information is collected by the adjuster who may not be able to determine exact measurements or types of materials. Thus, at least one technical problem with conventional technology is that repair related information is not accurately or efficiently obtained. Another technical problem with conventional technology is that it does not use or leverage smart home technology to obtain repair related information. Thus, this patent document describes systems, devices, and methods where repair or replacement related information is obtained from a smart building, such as a home equipped with smart home technology, where the repair or replacement related information can be analyzed to efficiently and/or accurately obtain, for example, an estimated cost of repair or replacement or both. The combination of the information obtained using smart home technology along with the processing of such information can provide a practical technical benefit at least because it can efficiently and accurately determine information used to repair a damaged area in a house. Although obtaining repair related information and determining repair related costs is discussed throughout this document, in each instance, replacement information can also be obtained and replacement costs can be determined.

FIG. 1 shows an example of a room 100 equipped with smart home technology to enable a system to obtain repair related information. The room includes smart devices such as a smoke detector 102, a water leak detector 104, and a thermostat 108. The smart devices 102, 104, 108 can wirelessly communicate with a router 106 so that information collected by such smart devices can be accessed by a mobile device (e.g., smartphone or laptop) via the Internet. For example, if a water leak detector 104 detects an amount of water or moisture that exceeds a pre-determined threshold, the water leak detector 104 can send a message to a server operated by the water leak detector provider via the router 106 so that the server can send a notification message to a mobile device of the person who owns or rents the room 100.

The notification message can be displayed on the mobile device to inform the person that a possible water leak has been detected.

The room includes additional smart devices that can be placed on or in certain building materials of the room. For example, in room 100 a portion of a wall is cutout 110 to expose the plurality of studs 112 that are located in between the inner and outer walls. The cutout 110 shows five studs with each stud 112 including a smart device such as an RFID tag 114 that can be placed on or in each stud 112. The RFID tag 114 located on or in the stud can include memory that can store information that can be used for repair purposes (e.g., type of material, origin of material, dimensions, color, testing it has undergone, etc.). For example, since one stud can be located at a distance of either 16 inches or 24 inches of another stud, the RFID tag 114 can include an identifier that can be used to determine the distance between two adjacent studs. Thus, if a first set of studs are to be placed at a distance of 16 inches of each other in one home, then an RFID tag having a first identifier can be installed on or in such studs, and if a second set of studs are to be placed at a distance of 24 inches of each other in another home, then an RFID tag having a second identifier can be installed on or in such studs, where the first and second identifiers are associated with a distance of 16 and 24 inches, respectively. In another example, a scanning application (shown as 350 in FIG. 3) operating on a mobile device can determine a total distance of a scanned region that includes at least the multiple scanned RFID tags and by determining a distance that the mobile device traveled between a first RFID tag scanned and the last RFID tag scanned. As further explained in this patent document, this identifier information along with other information can be used to determine an estimate of a region that is damaged and that needs to be replaced.

Figure 2A:
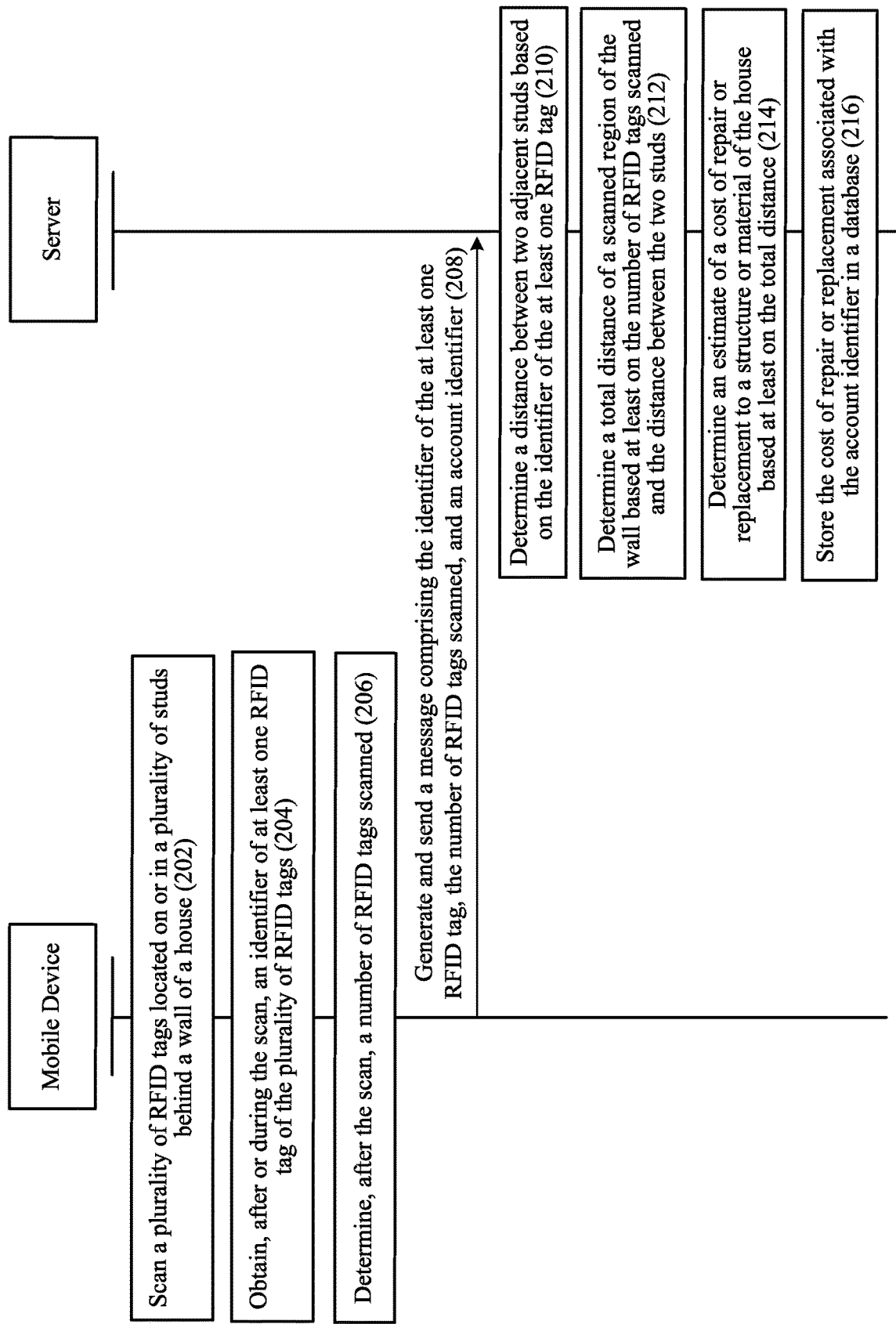
FIG. 2A shows an example system for obtaining repair related information from a plurality of studs from a smart building in accordance with embodiments of the technology.

FIG. 2A shows an example system for obtaining repair related information from a plurality of studs from a smart building. A mobile device that includes an RFID scanner or RFID reader or RFID sensor (shown as 340 in FIG. 3) that can perform a scanning operation 202 to scan the plurality of RFID tags located on or in a plurality of studs being a wall of a house. For example, a scanning application (shown as 350 in FIG. 3) operating on the mobile device can show on a display (shown as 360 in FIG. 3) a message instructing a person operating the mobile device to start scanning for the studs at a pre-determined distance from one end of a damaged region and end scanning for the studs at the pre-determined distance from the other end of the damaged region. For example, the message displayed on the mobile device can instruct the person operating the mobile device to start scanning for the studs from approximately three-feet to the left of a left-most edge of a damaged region and end scanning at approximately three-feet to the right of a right-most edge of the damaged region.

The scanning application of the mobile device can perform an obtaining operation 204 to obtain after or during the scanning operation an identifier of at least one RFID tag. In some embodiments, the identifier in each of the plurality of RFID tags located on or in the studs can include a first value that corresponds to the distance between the two adjacent studs and/or a second value that indicates that each of the plurality of RFID tags is located on or in a stud. The processing of the identifier of at least one RFID tag is further described in operation 210 below. The person operating the mobile device indicates via a "finish scanning" button on a graphical user interface (GUI) of the scanning application that he or she has finished scanning the studs within an area that comprises the damaged region and an offset region defined by the pre-determined distances to the left and right of the damaged region.

After the scanning operation is performed or after the scanning application receives the finished scanning indication, the scanning application can perform a determining operation 206 to determine a number of RFID tags that were scanned as part of the scanning operation. The scanning application can perform a generating and sending operation 208 to generate and send to a server a message comprising the identifier of the at least one RFID tag, the number of RFID tags scanned, and an account identifier that uniquely identifies an account associated with a person who owns or rents the house. The account identifier may be previously stored on the memory of the mobile device and may include a membership identifier associated with the person who owns or rents the house. The account identifier can also indicate a location of the building.

The server includes a repair application (shown as 440 in FIG. 4) that receives the message sent by the mobile device at the sending operation 208. The repair application performs a first determine operation 210 where the repair application determines a distance between two adjacent studs based on the identifier of the at least one RFID tag. In some embodiments, each of the plurality of RFID tags located on or in the studs stores an identifier that includes a first value that corresponds to the distance between two adjacent studs. For example, the first value can include unique values such as the numbers "16" or "24" to indicate that the distance between the studs is 16 inches or 24 inches, respectively. In a second example, the first value can include a code "A" or "B" that corresponds to the distance between the studs being 16 inches or 24 inches, respectively. In the second example, the repair application can access a lookup table stored in a memory on the server to determine that the received code "A" or "B" means that the studs are 16 inches apart or 24 inches apart, respectively.

At the second determine operation 212, the repair application determines a total distance of a scanned region of the wall based on the number of RFID tags scanned and the distance between the two adjacent studs. For example, if the identifier for the at least on RFID tag indicates that the distance between the studs is 16 inches and if the number of RFID tags scanned is two, then the total distance could be determined to be 32 inches. In some embodiments, locations of the mobile device can be determined, for example, by global positioning system (GPS), triangulation or other means, while the mobile device is scanning each of the RFID tags. Using this location information, various distances (e.g., length of a room) can be determined. In some embodiments, only a few RFID tags need to be scanned to determine a length of the room and/or the extent of the damage.

At the third determine operation 214, the repair application determines an estimate of a cost of repair and/or replacement to a structure or material of the house (e.g., drywall and/or number of studs) based at least on the total distance. Upon obtaining the total distance of the damaged region on a surface such as a wall, the square footage of the damaged surface can be calculated by incorporating information from digital measuring tools that can help capture the height of the wall, which in turn can be used to derive the square footage of the damaged surface. In some embodiments, the mobile device may prompt a user to enter an estimated ceiling height and can provide that information to the repair application that uses the height information with the total distance to determine square footage, which can be used to determine the estimate of the cost of repair and/or replacement. The estimate could include the cost of the studs needed to be replaced based on a number of RFIDs scanned or an estimated area of the drywall to be replaced based on the total distance multiplied by a pre-determined height of the drywall that may need to be replaced. The cost of each stud and a cost per square feet of drywall may be previously stored in a table in the server. Thus, the repair application can obtain the per unit cost of a stud or the per square feet cost of a drywall and determine the estimated cost of repair or replacement of the stud and/or drywall based on the number of RFIDs scanned and/or the estimated area of the drywall to be repaired or replaced. In some embodiments, an estimated amount of flooring can also be determined. At the storing operation 216, the repair application stores the cost of repair associated with the account identifier in a database.

Figure 2B:
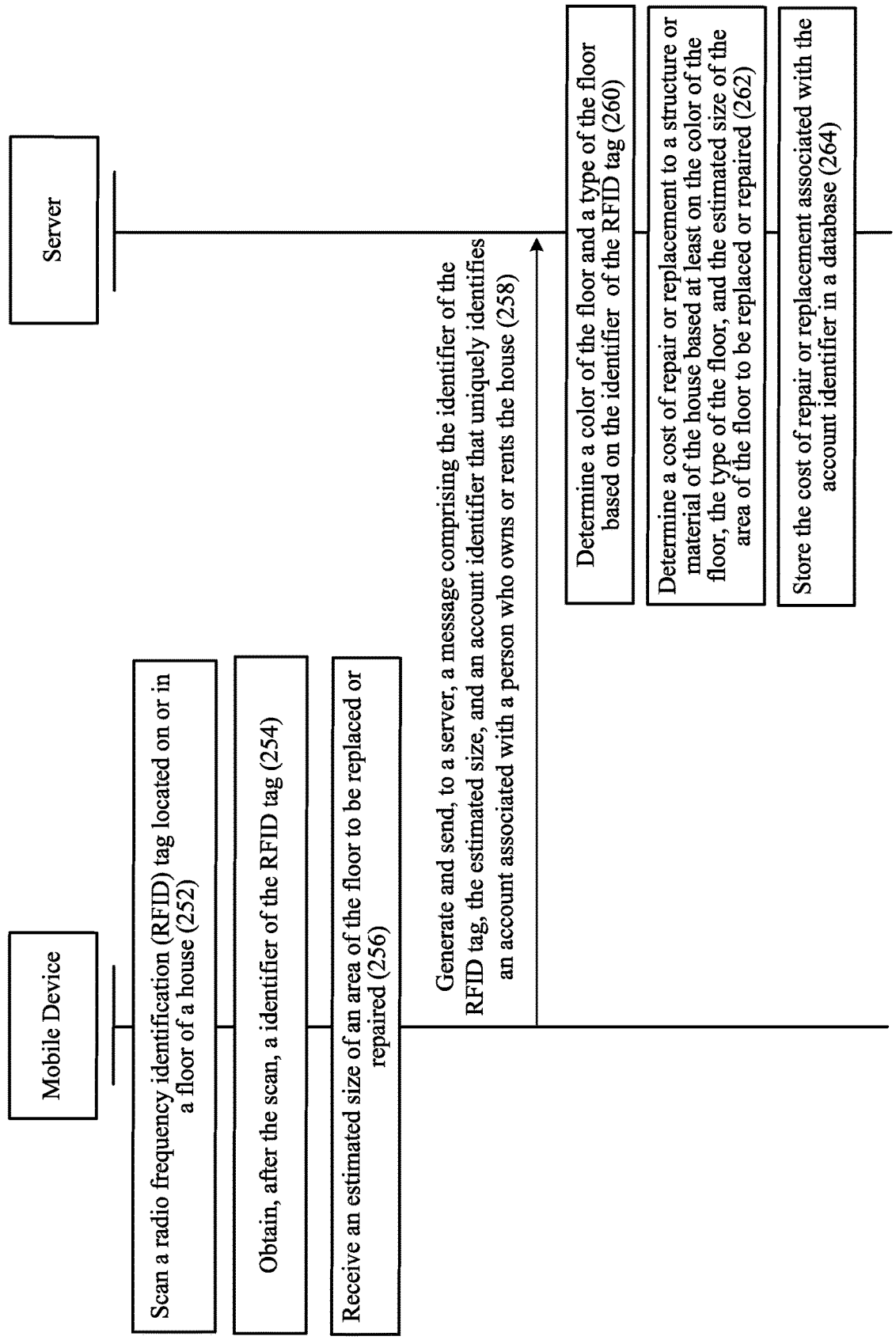
FIG. 2B shows an example system for obtaining repair related information from a floor of a smart building in accordance with embodiments of the technology.

FIG. 2B shows an example system for obtaining repair related information from a floor of a smart building. A mobile device can perform a scanning operation 252 to scan a radio frequency identification (RFID) tag located on or in a floor of a house. For example, a scanning application operating on the mobile device can show on a display a message instructing a person operating the mobile device to scan an RFID tag located in a floor, where information obtained from scanning the RFID tag can be used to determine a cost of repairing the floor. Flooring related RFID tags can be used to identify the type of material of the floor. In some embodiments, graphene threaded paint can be used to identify paint. Three-dimensional (3D) printed houses can include similar type identifying RFID tags in the floor, walls, and/or studs.

The scanning application of the mobile device can perform an obtaining operation 254 to obtain after the scanning operation an identifier of a RFID tag. In some embodiments, the RFID tag located on or in the floor can store the identifier that includes a set of values that identify the color of the floor and the type of the floor, and/or the identifier of the RFID tag can includes a value that indicates that the RFID tag is located on or in the floor. The type of the floor includes tile, carpet, hardwood, or laminate.

After the scanning operation is performed, the scanning application can perform a receiving operation 256 to receive an estimated size of an area of the floor to be replaced or repaired. In some embodiments, a user operating the mobile device can use a graphical user interface to draw an outline around a damaged area on a floor (e.g., in a picture taken by the mobile device) and the mobile device can use conventional image processing techniques to estimate or determine an area of the outline drawn by the user. In other embodiments, the user can take a picture of the damaged floor, which the scanning application can analyze to determine the area of the floor that is damaged. In some other embodiments, the scanning application can prompt a user to enter an estimate of a size of a room and an estimate of the damaged area in the room. In some embodiments, a size of a room can be estimated by a scanning application by scanning RFIDs of the studs adjacent to the walls in the room. In such embodiments, the scanning application can, for each wall, enable the user to scan the RFIDs of the multiple studs behind a wall. Using the number of studs scanned for each of a plurality of walls, and using the distance between two studs (indicated by the identifier in the RFID as described in this patent document), the scanning application can estimate a total area scanned.

The scanning application can perform a generating and sending operation 258 to generate and send, to a server, a message comprising the identifier of the RFID tag, the estimated size of an area of the floor to be replaced or repaired, and an account identifier that uniquely identifies an account associated with a person who owns or rents the house. The account identifier may be previously stored on the memory of the mobile device and may include a membership identifier associated with the person who owns or rents the house.

The repair application of the server receives the message sent by the mobile device at the sending operation 258. The repair application performs a first determine operation 260 where the repair application determines a color of the floor and a type (e.g., material) of the floor based on the identifier of the RFID tag. In some embodiments, the RFID tag located on or in the floor stores the identifier that includes a set of values that identify the color of the floor and the type of the floor. For example, a first value in the set of values can be three-bit manufacturer of the floor followed by a four-bit color code. In another example, a second value in the set of values can be a three-bit code that can identify the type of floor (e.g., a bit value of 001 can indicate that the flooring is laminate, a bit value of 010 can indicate that the flooring is carpet, etc.).

At the second determine operation 262, the repair application determines a cost of repair or replacement to a structure (e.g., floor) or material (e.g., type of floor) of the house based at least on the color of the floor, the type of the floor, and the estimated size of the area of the floor to be replaced or repaired. In some embodiments, the cost of repair or replacement can be determined by the repair application by also using a make and model of the floor, which can be included in the identifier of the RFID tag. In some embodiments, the repair application can determine a cost of repair or replacement of floor (or walls, etc.) by sending information about the scanned floor (or studs, etc.) to another server that stores pricing information based on information about the floor (e.g., type of floor, make, manufacturer, model, color, etc.). The another server can provide the pricing information per square foot to the repair application so that the repair application can estimate a cost of repair or replacement of the structure or material.

At the storing operation 264, the repair application stores the cost of repair or replacement associated with the account identifier in a database. In some embodiments, the repair application can store, in the database and associated with the account identifier, the color of the floor and the type of the floor to generate a home profile that describes information related the house.

In some cases, an entire floor in a room may need to be replaced based on a type of the flooring. To address such cases, at the second determine operation 262, the repair application can determine a cost of repair or replacement of the entire floor in the room based on the determined type of the floor (e.g., carpet) and the estimated size of the entire floor in the room to be replaced or repaired (which can be obtained at receiving operation 256).

In some cases, if the flooring that includes a damaged area continues into other rooms, the repair application can determine cost of replacing the flooring in other rooms as well. For example, the mobile device can perform image processing on a picture taken of a room where a damaged area is located to determine whether there is a break in the flooring in the room (e.g., presence of a transition strip between a room and another area). In some embodiments, the mobile device can prompt a user to enter information about whether there is a break in the flooring associated with the damaged area. The mobile device can provide the break related information (e.g., an indication of a presence or absence a transition strip) in the message sent to the server at the generating and sending operation 258. In some embodiments, the mobile device can provide the picture to the server at the generating and sending operation 258 so that the repair application can perform image processing on the picture to determine a presence of a break in the flooring in the room.

If the repair application determines a break in the flooring or if the repair application receives from the mobile device an indication of a presence of a break in the flooring, the repair application can determine a cost of repair and/or replacement for the damaged area or the entire room as described above in this patent document. If, however, the repair application determines an absence of a break in the flooring or if the repair application receives from the mobile device an indication of an absence of break in the flooring, the repair application can determining cost of repairing and/or replacing the flooring in one or more additional rooms/areas based on information about one or more sizes of the one or more additional rooms/areas. For example, a mobile device can prompt a user to provide the one or more sizes of the one or more additional rooms/areas into which the flooring that includes the damaged area extends without a break. The mobile device can provide the one or more sizes to the server so that the repair application can determine a total cost of the repair or replacement of the flooring.

Figure 2C:
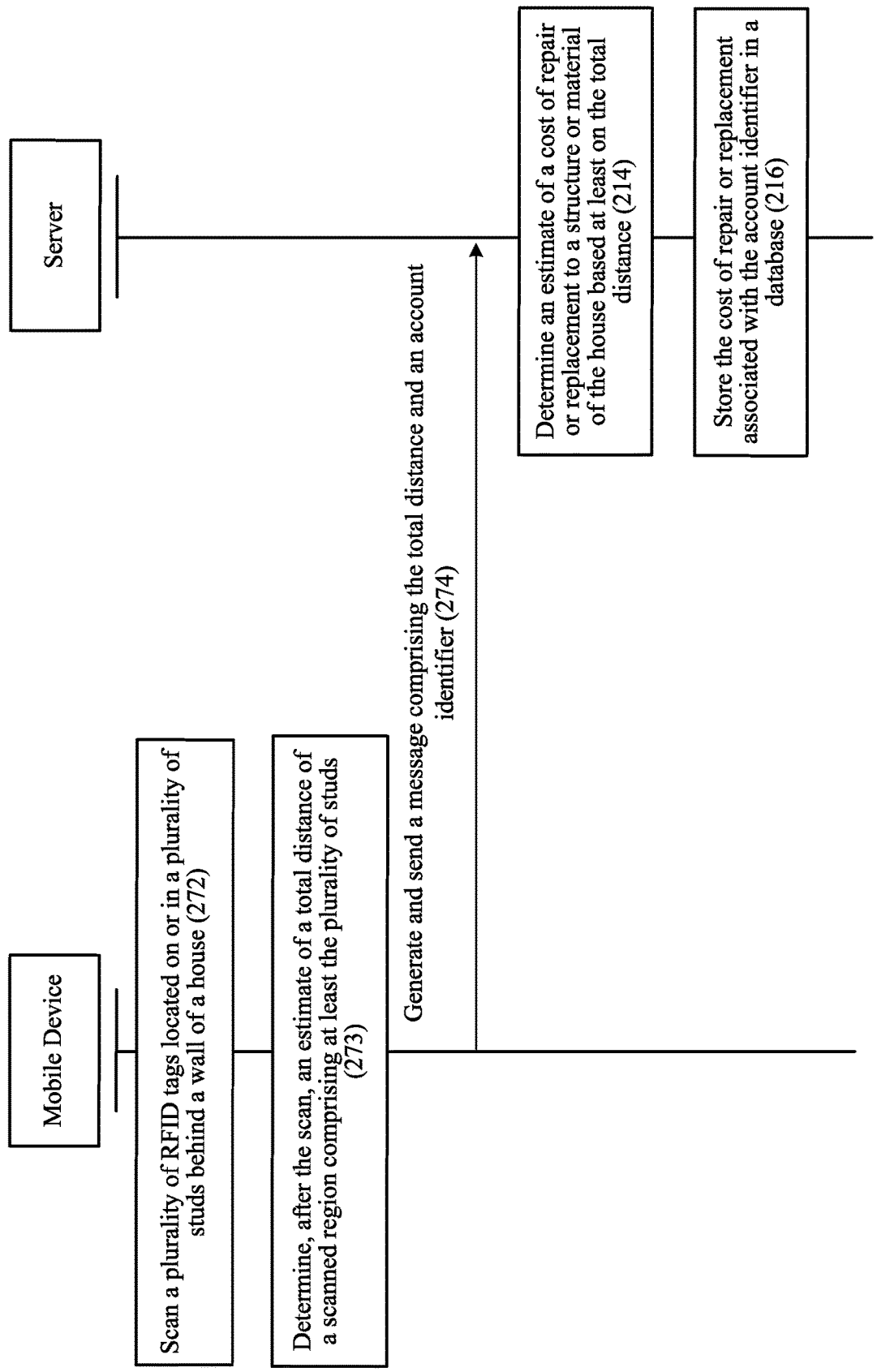
FIG. 2C shows another example system for obtaining repair related information from a plurality of studs from a smart building in accordance with embodiments of the technology.

FIG. 2C shows another example system for obtaining repair related information from a plurality of studs from a smart building. A mobile device can perform a scanning operation 272 to scan the plurality of RFID tags located on or in a plurality of studs being a wall of a house. For example, a scanning application can show on a display a message instructing a person operating the mobile device to start scanning for the studs at a pre-determined distance from one end of a damaged region and end scanning for the studs at the pre-determined distance from the other end of the damaged region. For example, the message displayed on the mobile device can instruct the person operating the mobile device to start scanning for the studs from approximately three-feet to the left of a left-most edge of a damaged region and end scanning at approximately three-feet to the right of a right-most edge of the damaged region. The person operating the mobile device indicates via a "finish scanning" button on a graphical user interface (GUI) of the scanning application that he or she has finished scanning the studs within an area that comprises the damaged region and an offset region defined by the pre-determined distances to the left and right of the damaged region.

After the scanning operation is performed or after the scanning application receives the finished scanning indication, the scanning application can perform a determining operation 273 to determine an estimate of a total distance of the scanned region comprising at least the plurality of studs. The scanning application can employ conventional techniques (e.g., using GPS, inertial measurement unit (IMU), accelerometer, and/or gyroscope related measurements) to determine a total distance travelled by the mobile device as the plurality of RFID tags are scanned as part of the scanning operation 272. Thus, the scanning application can determine a total distance of a scanned region that includes at least the multiple scanned RFID tags by determining a distance that the mobile device traveled between a first RFID tag scanned and the last RFID tag scanned. In some embodiments, the scanning application can determine the total distance of the scanned region that includes the scanned plurality of RFIDs and the tow pre-determined distances to the left and right of the damaged region.

The scanning application can perform a generating and sending operation 274 to generate and send to a server a message comprising the total distance and an account identifier that uniquely identifies an account associated with a person who owns or rents the house. The account identifier may be previously stored on the memory of the mobile device and may include a membership identifier associated with the person who owns or rents the house. The account identifier can also indicate a location of the building.

The repair application of the server receives the message. The repair application performs a determine operation 276 where the repair application determines an estimate of a cost of repair and/or replacement to a structure or material of the house (e.g., drywall and/or number of studs) based at least on the total distance using techniques described in this patent document. Upon obtaining the total distance of the damaged region on a surface such as a wall, the square footage of the damaged surface can be calculated using techniques described in this patent document. At the storing operation 216, the repair application stores the cost of repair associated with the account identifier in a database.

In some embodiments, a smart device located inside or outside the house can trigger the process shown in FIGS. 2A, 2B, and/or 2C. For example, a scanning application of the mobile device can receive, from a device located inside or outside the house, a second message that indicates a presence of moisture in the wall of the house or that indicates a potential water damage to the wall of the house. In such a scenario, the scanning application can display, after the second message is received, a third message that prompts a user of the mobile device to indicate whether a process to scan the wall is to be initiated to determine the cost of repair or replacement. The scan of the plurality of RFID tags located on or in studs (operation 202 in FIG. 2A or operation 272 in FIG. 2C) or the scan of a RFID tag on or in a floor (operation 252 in FIG. 2B) is performed in response to receiving an indication that a scan operation is requested. In some embodiments, a device that sends a second message can include a water leak detector or water leak sensor located in a room or attached on or near the main water line inside or outside the house or attached to a water meter associated with the house.

The techniques described in this patent document for scanning RFIDs on or in studs and/or floors can be employed in fences around the house or other contents in the house to determine repair or replacement costs. For example, using the scanning operation described for the studs, the scanning application can scan fences that need to be replaced and a repair application can determine cost of repair or replacement of the fences based on the information (e.g., total distance scanned, number of RFID tags scanned, etc.) the repair application receives from the scanning application of the mobile device.

Figure 3:
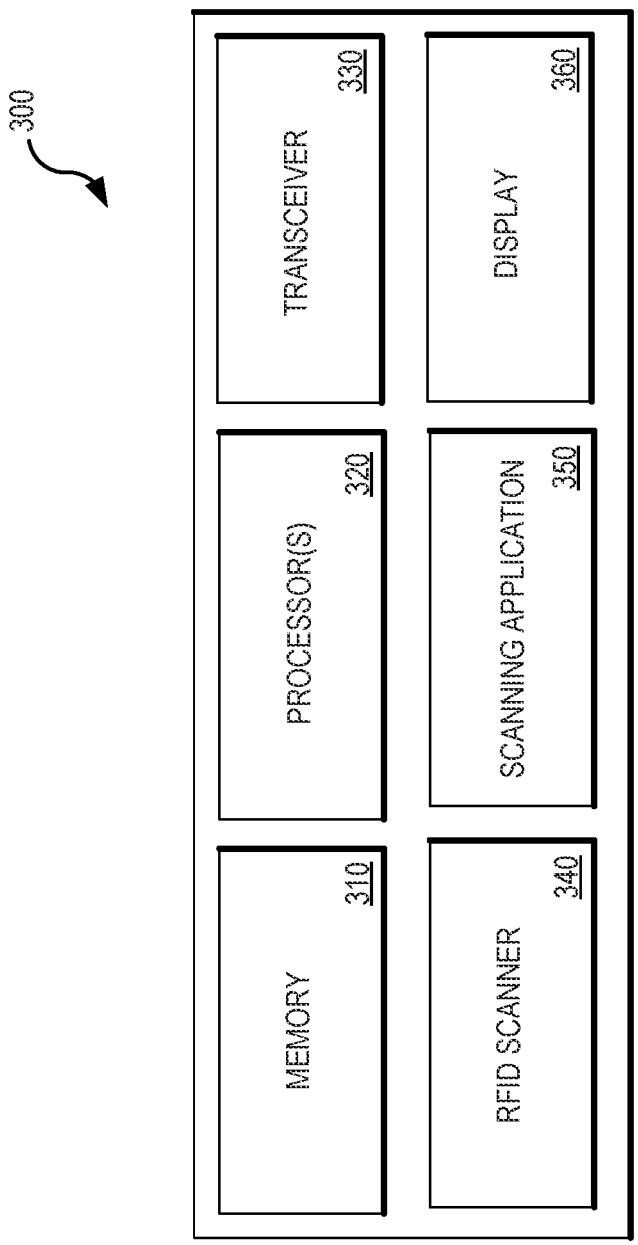
FIG. 3 shows a block diagram of a mobile device operated to obtain repair related information in accordance with embodiments of the technology.

FIG. 3 shows a block diagram of a mobile device operated to obtain repair related information. The mobile device 300 includes at least one processor 320 and a memory 310 having instructions stored thereupon. The instructions upon execution by the processor 320 configure the mobile device 300 to perform the operations described in FIGS. 2A, 2B and/or 2C, and to perform the operations associated with the various devices and the scanning application 350 as described in this patent document.

According to the embodiments shown in FIG. 3, the mobile device 300 can include memory 310, one or more processors 320, transceiver 330, RFID scanner 340, scanning application 350, and display 360. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module. The mobile device 300 includes a transceiver (e.g., a transmitter and a receiver). The transmitter can send the message comprising the scanned RFID related information to a server.

Figure 4:
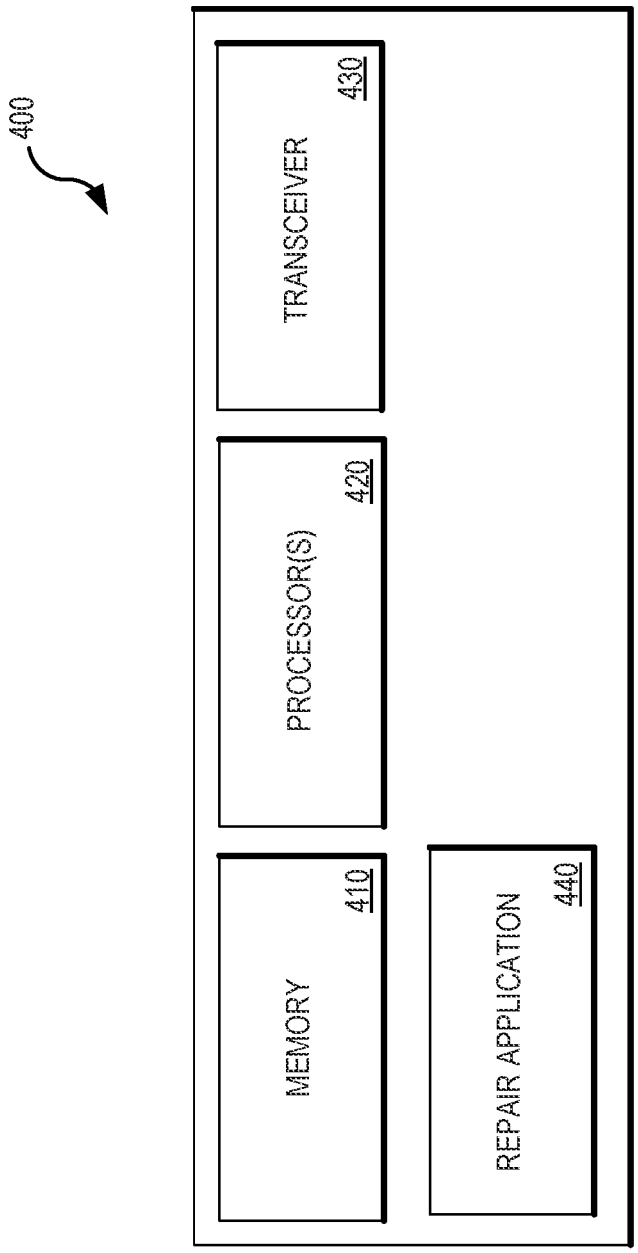
FIG. 4 shows a block diagram of a server operated to obtain and process the repair related information in accordance with embodiments of the technology.

FIG. 4 shows a block diagram of a server operated to obtain and process the repair related information. The server 400 includes at least one processor 420 and a memory 410 having instructions stored thereupon. The instructions upon execution by the processor 420 configure the server 400 to perform the operations described in FIGS. 2A, 2B, and/or 2C, and to perform the operations associated with the various devices and the repair application 440 as described in this patent document.

According to the embodiments shown in FIG. 4, the server 400 can include memory 410, one or more processors 420, transceiver 430, and repair application 440. Other embodiments of the present disclosure may include some, all, or none of these modules and components along with other modules, applications, and/or components. Still yet, some embodiments may incorporate two or more of these modules and components into a single module and/or associate a portion of the functionality of one or more of these modules with a different module. The server 400 includes a transceiver (e.g., a transmitter and a receiver). The receiver can receive the message generated by a mobile device, where the message comprises the scanned RFID related information.

Memory 310, 410 can be any device, mechanism, or populated data structure used for storing information. In accordance with some embodiments of the present disclosure, memory 310, 410 can encompass, but is not limited to, any type of volatile memory, nonvolatile memory, and dynamic memory. For example, memory 310, 410 can be random access memory, memory storage devices, optical memory devices, magnetic media, floppy disks, magnetic tapes, hard drives, SIMMs, SDRAM, DIMMs, RDRAM, DDR RAM, SODIMMS, EPROMS, EEPROMs, compact discs, DVDs, and/or the like. In accordance with some embodiments, memory 310, 410 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory 310, 410.

Memory 310, 410 may be used to store instructions for running one or more applications or modules on processor(s) 320, 420. For example, memory 310, 410 could be used in one or more embodiments to house all or some of the instructions needed to execute the functionality of the various modules.

Some implementations can be operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, portable electronic devices such as smartphones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 5:
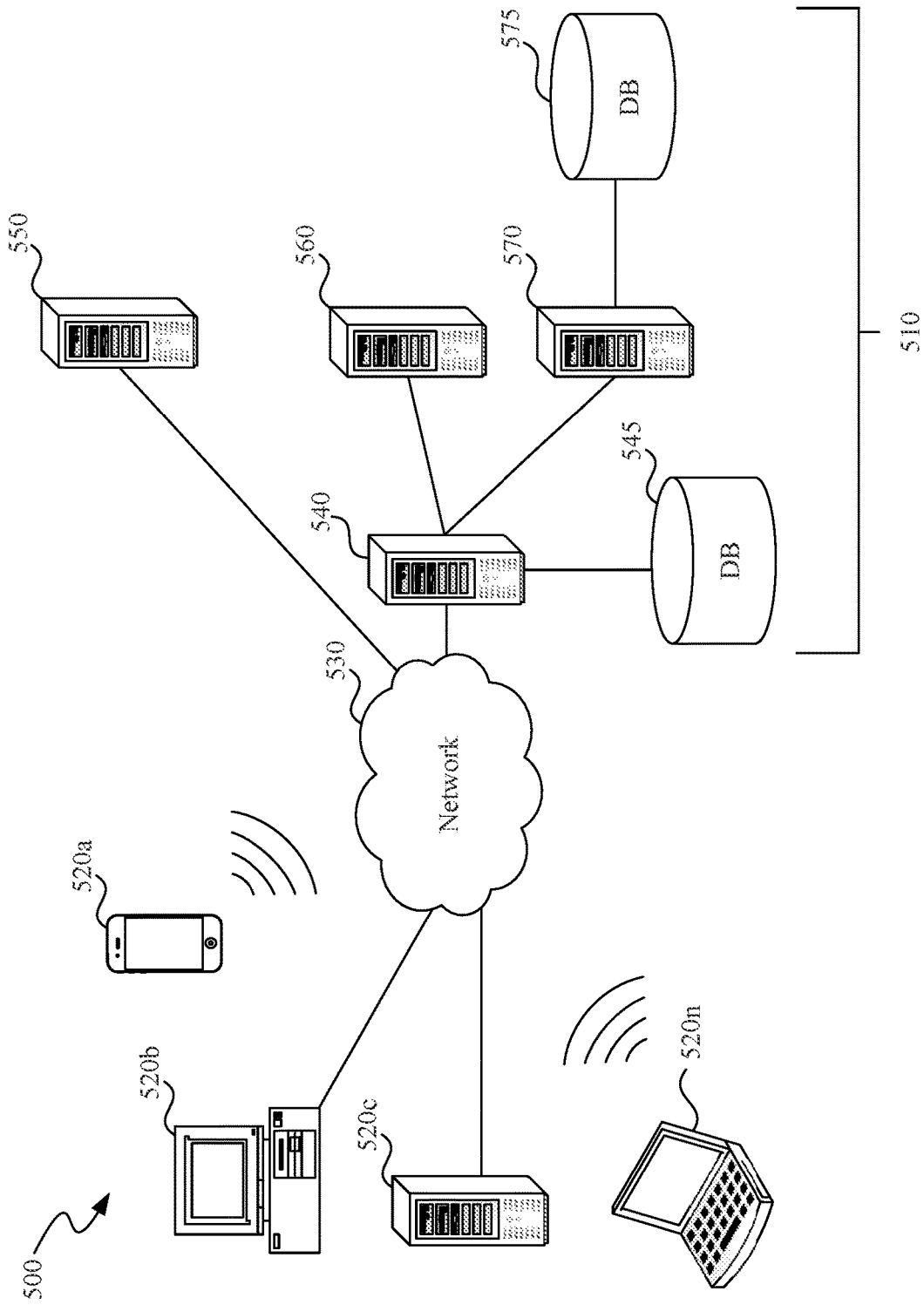
FIG. 5 shows an example repair or replacement system where mobile devices provide information obtained from a scan operation in accordance with embodiments of the technology.

FIG. 5 shows an example system 500 where mobile devices 520a to 520n provide scanning operation related information to a repair or replacement system 510. A repair or replacement system 510 may include a server 540 used by the mobile devices to provide scan related information, one or more servers 550, 560, 570, and one or more databases 545, 575. One or more of servers 540 to 570 may include the devices and application(s) described in FIG. 4, and one or more mobile devices 520a to 520n may include the devices and application(s) described in FIG. 3. Data located on the one or more servers 540, 550, 560, and 570 or on the one or more databases 545, 575 can be accessed via the network 530, such as the Internet or Intranet. For example, the mobile devices 520a to 520n can provide scan related information to a server and/or database(s) associated with the repair or replacement system 510 via the network 530. The mobile devices 520a to 520n may include computers such as a smart phone device 520a, a desktop 520b, 520c or a laptop 520n.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively.

Several implementations of the disclosed technology are described above in reference to the figures. The computing devices on which the described technology may be implemented can include one or more central processing units, memory, user devices (e.g., keyboards and pointing devices), output devices (e.g., display devices), storage devices (e.g., disk drives), and network devices (e.g., network interfaces). The memory and storage devices are non-transitory computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item, such as A and A; B, B, and C; A, A, B, C, and C; etc.

The above Detailed Description of examples of the technology is not intended to be exhaustive or to limit the technology to the precise form disclosed above. While specific examples for the technology are described above for illustrative purposes, various equivalent modifications are possible within the scope of the technology. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112 (f) will begin with the words "means for", but use of the term "for" in any other context is not intended to invoke treatment under 35 U.S.C. § 112 (f). Accordingly, the applicant reserves the right to pursue additional claims after filing this application to pursue such additional claim forms, in either this application or in a continuing application.

What is claimed is:

1. A system for obtaining repair or replacement related information, comprising:
   a mobile device comprising a radio frequency identification (RFID) scanner, a localization unit, and a first processor, the mobile device configured to:
      scan, via the RFID scanner, a plurality of RFID tags located on or in a plurality of studs behind a wall of a house, based on a first instruction to scan the plurality of RFID tags generated by a scanning application operating on the mobile device;
      determine, while the RFID scanner is contemporaneously scanning the plurality of RFID tags and based on a second instruction generated by the scanning application, multiple locations of the mobile device by the localization unit, the localization unit utilizing a global positioning system, triangulation, an inertial measurement unit, or any combination thereof;
      obtain, via the RFID scanner, an identifier of at least one RFID tag of the plurality of RFID tags;
      determine, by the scanning application operating on the mobile device, after the scan is indicated as complete via the scanning application, a number of RFID tags scanned; and
      generate and send, by the scanning application operating on the mobile device, to a server, a message comprising the identifier of the at least one RFID tag obtained by the RFID scanner, the number of RFID tags scanned, and an account identifier that uniquely identifies an account associated with a person who owns or rents the house, augmented with the multiple locations of the mobile device determined while the plurality of RFID tags were contemporaneously scanned;
   wherein the server, comprising a second processor, is configured to:
      receive the message comprising the identifier, the number of RFID tags scanned and the account identifier, augmented with the multiple locations of the mobile device while the plurality of RFID tags were contemporaneously scanned;
      determine a distance between two adjacent studs based on the identifier of the at least one RFID tag;
      determine a total distance of a scanned region of the wall based on the number of RFID tags scanned, the distance between the two adjacent studs, and the multiple locations of the mobile device while the plurality of RFID tags were scanned;
      determine an estimate of a cost of repair or replacement to a structure or material of the house based at least on the total distance; and
      store the cost of repair or replacement associated with the account identifier in a database.

2. The system of claim 1, wherein each of the plurality of RFID tags located on or in the plurality of studs stores the identifier that includes a first value that corresponds to the distance between the two adjacent studs.

3. The system of claim 1, wherein the identifier of each of the plurality of RFID tags includes a second value that indicates that each of the plurality of RFID tags is located on or in a stud.

4. The system of claim 1, wherein the mobile device comprising the first processor is further configured to:
receive, from a device located inside or outside the house, a second message that indicates a presence of moisture in the wall of the house or that indicates potential water damage to the wall of the house; and
display, after the second message is received, a third message that prompts a user of the mobile device to indicate whether a process to scan the wall is to be initiated to determine the cost of repair or replacement,
wherein the scan of the plurality of RFID tags is performed further in response to receiving an indication that a scan operation is requested.

5. A method of obtaining repair or replacement related information, comprising:
receiving, by a server from a mobile device, a message comprising A) an identifier of at least one radio frequency identification (RFID) tag, B) a number of a plurality of RFID tags scanned by an RFID scanner of a mobile device based on a first instruction generated by a scanning application operating on the mobile device, and C) an account identifier that uniquely identifies an account associated with a person who owns or rents the house, augmented with D) multiple locations of the mobile device obtained by a localization unit of the mobile device while the plurality of RFID tags were contemporaneously being scanned and based on a second instruction generated by the scanning application,
wherein the plurality of RFID tags are located on or in a plurality of studs behind a wall of a house,
wherein the plurality of RFID tags include the at least one RFID tag, and
wherein the localization unit utilizes a global positioning system, triangulation, an inertial measurement unit, or any combination thereof;
determining a distance between two adjacent studs based on the identifier of the at least one RFID tag;
determining a total distance of a scanned region of the wall based on the number of RFID tags scanned, the distance between the two adjacent studs, and the multiple locations of the mobile device while the plurality of RFID tags were scanned;
determining an estimate of a cost of repair or replacement to a structure or material of the house based at least on the total distance; and
storing the cost of repair associated with the account identifier in a database.

6. The method of claim 5, wherein each of the plurality of RFID tags located on or in the plurality of studs stores the identifier that includes a first value that corresponds to the distance between the two adjacent studs.

7. The method of claim 5, wherein the identifier of each of the plurality of RFID tags includes a second value that indicates that each of the plurality of RFID tags is located on or in a stud.

8. The method of claim 5, wherein the plurality of RFID tags is scanned further in response to receiving, from a device located inside or outside the house, a second message that indicates a presence of moisture in the wall of the house or that indicates a potential water damage to the wall of the house.

9. A computer-readable storage medium storing instructions that, when executed by a server, cause the server to perform a process for obtaining repair or replacement related information, the process comprising:
receiving, by the server from a mobile device, a message comprising A) an identifier of at least one radio frequency identification (RFID) tag, B) a number of a plurality of RFID tags scanned by an RFID scanner of a mobile device based on a first instruction generated by a scanning application operating on the mobile device, and C) an account identifier that uniquely identifies an account associated with a person who owns or rents the house, augmented with D) multiple locations of the mobile device obtained by a localization unit of the mobile device while the plurality of RFID tags were contemporaneously being scanned and based on a second instruction generated by the scanning application,
wherein the plurality of RFID tags are located on or in a plurality of studs behind a wall of a house,
wherein the plurality of RFID tags include the at least one RFID tag, and
wherein the localization unit utilizes a global positioning system, triangulation, an inertial measurement unit, or any combination thereof;
determining a distance between two adjacent studs based on the identifier of the at least one RFID tag;
determining a total distance of a scanned region of the wall based on the number of RFID tags scanned, the distance between the two adjacent studs, and the multiple locations of the mobile device while the plurality of RFID tags were scanned;
determining an estimate of a cost of repair or replacement to a structure or material of the house based at least on the total distance; and
storing the cost of repair associated with the account identifier in a database.

10. The computer-readable storage medium of claim 9, wherein each of the plurality of RFID tags located on or in the plurality of studs stores the identifier that includes a first value that corresponds to the distance between the two adjacent studs.

11. The computer-readable storage medium of claim 9, wherein the identifier of each of the plurality of RFID tags includes a second value that indicates that each of the plurality of RFID tags is located on or in a stud.

12. The computer-readable storage medium of claim 9, wherein the plurality of RFID tags is scanned further in response to receiving, from a device located inside or outside the house, a second message that indicates a presence of moisture in the wall of the house or that indicates a potential water damage to the wall of the house.

13. The computer-readable storage medium of claim 12, wherein the process further comprises:
displaying, after the second message is received, a third message that prompts a user of the mobile device to indicate whether a process to scan the wall is to be initiated to determine the cost of repair or replacement,
wherein the scan of the plurality of RFID tags is performed further in response to receiving an indication that a scan operation is requested.

14. A server for obtaining repair or replacement related information, the server comprising:
one or more processors; and
one or more memories storing instructions that, when executed by the one or more processors, cause the computing system to perform a process comprising:

receiving, by the server from a mobile device, a message comprising A) an identifier of at least one radio frequency identification (RFID) tag, B) a number of a plurality of RFID tags scanned by an RFID scanner of a mobile device based on a first instruction generated by a scanning application operating on the mobile device, and C) an account identifier that uniquely identifies an account associated with a person who owns or rents the house, augmented with D) multiple locations of the mobile device obtained by a localization unit of the mobile device while the plurality of RFID tags were contemporaneously being scanned and based on a second instruction generated by the scanning application,
  wherein the plurality of RFID tags are located on or in a plurality of studs behind a wall of a house,
  wherein the plurality of RFID tags include the at least one RFID tag, and
  wherein the localization unit utilizes a global positioning system, triangulation, an inertial measurement unit, or any combination thereof;
determining a distance between two adjacent studs based on the identifier of the at least one RFID tag;
determining a total distance of a scanned region of the wall based on the number of RFID tags scanned, the distance between the two adjacent studs, and the multiple locations of the mobile device while the plurality of RFID tags were scanned;
  determining an estimate of a cost of repair or replacement to a structure or material of the house based at least on the total distance; and
  storing the cost of repair associated with the account identifier in a database.

15. The computing system of claim 14, wherein each of the plurality of RFID tags located on or in the plurality of studs stores the identifier that includes a first value that corresponds to the distance between the two adjacent studs.

16. The computing system of claim 14, wherein the identifier of each of the plurality of RFID tags includes a second value that indicates that each of the plurality of RFID tags is located on or in a stud.

17. The computing system of claim 14, wherein the plurality of RFID tags is scanned further in response to receiving, from a device located inside or outside the house, a second message that indicates a presence of moisture in the wall of the house or that indicates a potential water damage to the wall of the house.

18. The computing system of claim 14, wherein the process further comprises:
  displaying, after the second message is received, a third message that prompts a user of the mobile device to indicate whether a process to scan the wall is to be initiated to determine the cost of repair or replacement,
  wherein the scan of the plurality of RFID tags is performed further in response to receiving an indication that a scan operation is requested.

* * * * *